May 7, 1946.  H. E. BERGMAN  2,399,784
BAG HOLDER FOR FILTER LEAVES
Filed Aug. 20, 1943
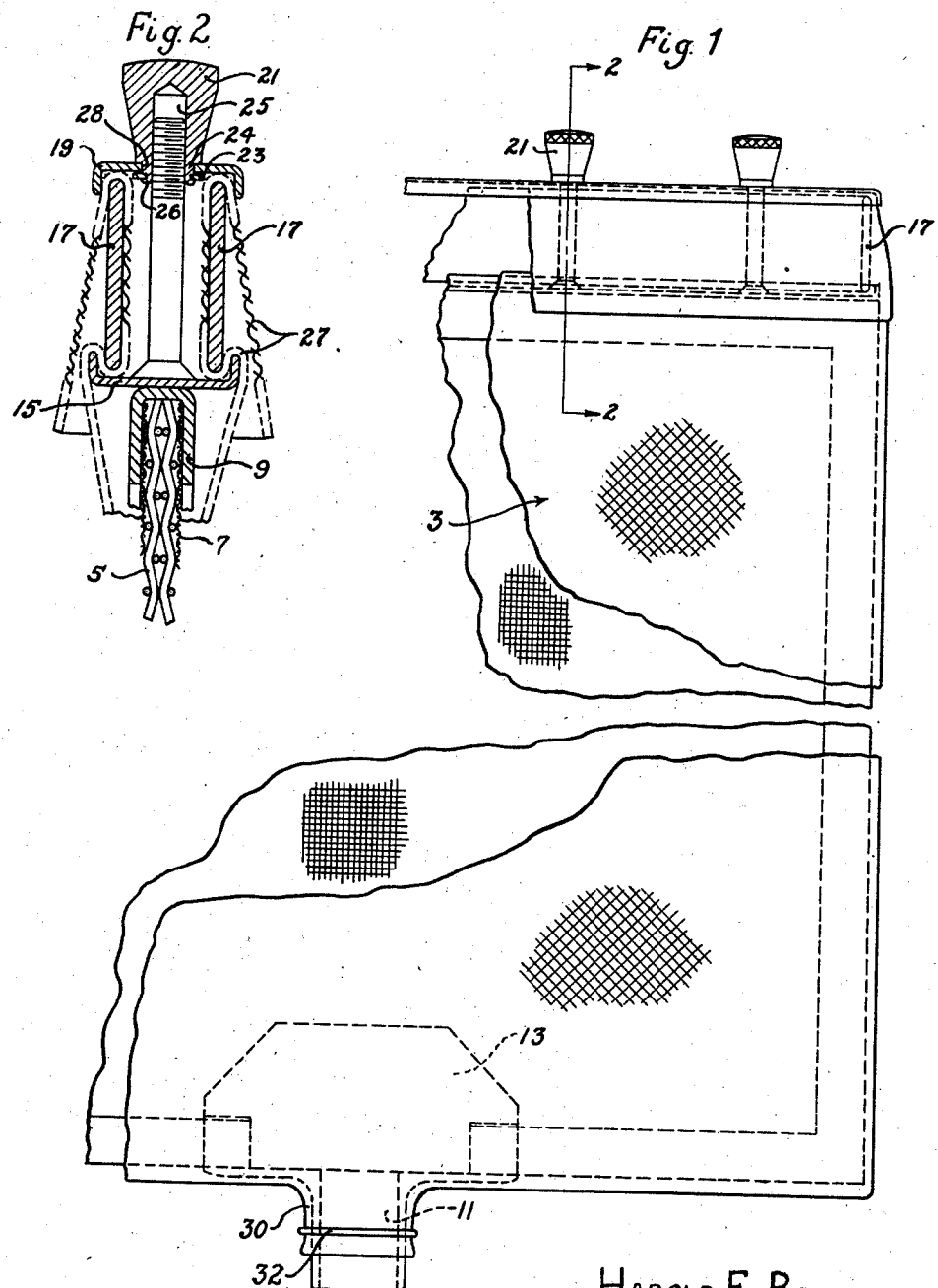
HAROLD E. BERGMAN
INVENTOR.
BY Edmund W. E. Kamm
ATTORNEY Patented May 7, 1946

2,399,784

UNITED STATES PATENT OFFICE 2,399,784

BAG HOLDER FOR FILTER LEAVES

Harold E. Bergman, Wilmette, Ill., assignor to S. F. Bowser & Company, Incorporated, Fort Wayne, Ind., a corporation of Indiana Application August 20, 1943, Serial No. 499,431

6 Claims. (Cl. 210—195)

This invention is concerned with a filter leaf employed in a filtration apparatus and more specifically to means for attaching a filter bag for covering the filtering surfaces of the leaf.

In the past, the filter cloths have been attached to the main filter element by drawing a bag over the filter leaf, gathering the open end about the discharge nozzle and tying it. This method permitted a certain amount of leakage of unfiltered liquid into the interior of the leaf and contaminated the filtrate. Further, the bag was not stretched tightly and uniformly over the leaf and this prevented complete precoating of the bag with a filter aid such as diatomaceous earth. In addition, the leaf did not readily retain its precoat.

It is an object of the invention to provide a filter bag attaching means which will prevent unnecessary leakage.

It is a further object to provide a simple filter bag attaching means that may quickly and readily be assembled and disassembled.

A further object of the invention is to provide a filter bag attaching means which is simple and of low cost.

Another object of the invention is to provide a filter bag attaching means which holds the bag tightly stretched over the filtering screens so that the leaf may be precoated and will hold the precoat.

These and other objects of the invention will further present themselves in the following description:

Figure 1 is an elevation of the filter element with parts broken away showing the arrangement of the bag holding means and the bag in place on the filter leaf.

Figure 2 is an enlarged sectional view taken on the line 2—2 of Figure 1 showing the structure disclosed in Figure 1.

With reference to Figure 1, the numeral 3 designates the filter leaf generally with its rectangular contour. The coarse, inner screen 5 and the outer, fine mesh screens 7 which comprise the surface of the leaf are inserted in and soldered to a U-edging 9 which is part of the frame of the filter leaf and which U-edging 9 almost surrounds the screens leaving only an opening at the bottom of the leaf for the filtrate outlet nozzle 11. This filtrate outlet nozzle 11 is attached to the filter leaf proper by a saddle 13 as shown which is held in place by rivets or some other suitable means.

To the U-edging 9 which spans the top of the filter leaf is welded a metal strip 15 whose peripheral edges are flanged upward that they may encompass the bottom edge of a vertically arranged continuous metal band 17 which is independent of the frame. The top edge of this metal band 17 is encompassed by another metal strip 19 whose edges are flanged downwardly. By the term "band" is meant a relatively thin-walled strip of material, preferably metal, which is bent and the ends of which are joined to form a right cylinder, the directrix of which conforms with, but lies inside of the peripheral flange on the element 15. In the case of the preferred form, the directrix of the cylinder is formed of a pair of parallel lines which are connected at their respective ends by semi-circles.

It should also be noted that the flanges on the elements are continuous so that in plan or in cross-section the contours of the band and the flanges are substantially parallel and are therefore in conformity one with the other.

This upper metal strip 19 is held in place by a plurality of knurled thumb nuts 21. Each nut 21 is provided with reduced sections 24 and 26, and the section 24 is received in a hole 28 while section 26 is received in a small washer 23 which contacts the underside of the aforementioned metal strip 19. The section 26 is spun outwardly to hold the parts in place. Thus when the thumb nut 21 is turned on its stud 25, the metal strip 19 is lowered or raised. The above-mentioned stud 25 is centrally welded to the upper side of the lower metal strip 15 and thus fixed to the frame of the filter leaf.

The assembly of the unit follows a simple procedure. The filter bag 27 is pulled over the bottom of the leaf. The bag is formed with a sleeve 30 which is slipped over the filtrate outlet nozzle 11 and there fastened by a cord or wire 32. The upper, open edge of the filter bag 27 is pulled up over the filter leaf and strip 15. It is next passed through the continuous metal band 17, which is in turn seated between the flanges of the lower metal strip 15. The bag is then turned inside out and is drawn down over the outside of the band 17. The upper metal strip 19 is then seated on the bag and the upper edge of the metal band 17 and the knurled thumb nuts 21 are tightened, thereby forming a liquid tight joint between the metal band 17, the peripheral edge of the filter bag 27 and the two metal strips 15 and 19. For disassembling, the process is reversed. The bag thus serves as a gasket between band 17 and strip 19.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter element, the combination of a filter leaf having a filtrate discharge nozzle, an open ended bag adapted to fit over said leaf and having a sleeve through which the nozzle projects, an end member on said leaf having a sealing surface and having a continuous peripheral flange disposed adjacent said surface, extending substantially perpendicular thereto and directed away from the leaf, a band adapted to lie closely adjacent and within said flange, said bag, at the open end, being disposed over said flange and under said band, and clamping means for forcing said band against the bag and the latter against said surface to close the bag.

2. In a filter element, the combination of a filter leaf having a filtrate discharge nozzle, an open ended bag adapted to fit over said leaf and having a sleeve through which said nozzle projects, a member mounted on the upper end of said leaf and having a sealing surface encompassed by a peripheral flange, said flange being directed away from said leaf, an elongated continuous band having an opening therethrough, said bag being passed over said flange, and through said opening, said band having a smaller perimeter than said flange and being adapted to seat on said bag and force the bag against the sealing surface within the peripheral flange to seal the bag closed, and means for clamping said band in place.

3. In a filter element, the combination of a filter leaf having a filtrate discharge nozzle, an open ended bag adapted to fit over said leaf and having a sleeve through which said nozzle projects, a member mounted on the upper end of said leaf and having a sealing surface encompassed by a peripheral flange, said flange being directed away from said leaf, an elongated continuous band having an opening therethrough, said bag being passed over said flange, and through said opening, said band having a slightly smaller perimeter than said flange and being adapted to seat on said bag and force the bag against the sealing surface within the peripheral flange to seal the bag closed, and means for clamping said band in place, comprising a post supported by said leaf and extending through the opening in said band, and means on said post for applying pressure on said band.

4. In a filter element, the combination of a filter leaf having a filtrate discharge nozzle, an open ended bag adapted to fit over said leaf and having a sleeve through which said nozzle projects, a member mounted on the upper end of said leaf and having a sealing surface encompassed by a peripheral flange, said flange being directed away from said leaf, an elongated continuous band having an opening therethrough, said bag being passed over said flange, through said opening and turned down over said band, said band having a smaller perimeter than said flange and being adapted to seat on said bag and force the bag against the surface within the peripheral flange to seal the bag closed, a second member having a sealing surface and means mounted on said filter leaf for holding said last named surface against the bag and the top of said band.

5. In a filter element, the combination of a filter leaf having a filtrate discharge nozzle, an open ended bag adapted to fit over said leaf and having a sleeve through which said nozzle projects, a member mounted on the upper end of said leaf and having a sealing surface encompassed by a peripheral flange, said flange being directed away from said leaf, an elongated continuous band having an opening therethrough, said bag being passed over said flange, through said opening and turned down over said band, said band having a smaller perimeter than said flange and being adapted to seat on said bag, a second member having a sealing surface encompassed by a down turned peripheral flange, both of said surfaces and flanges being substantially complementary, and means for forcing the second member toward said first member to compress the bag between the band and the respective surfaces to seal the bag closed.

6. In a filter element, the combination of a filter leaf having a filtrate discharge nozzle, an open ended bag adapted to fit over said leaf and having a sleeve through which said nozzle projects, a member mounted on the upper end of said leaf and having a sealing surface encompassed by a peripheral flange, said flange being directed away from said leaf, an elongated continuous band having an opening therethrough, said bag being passed over said flange, through said opening and turned down over said band, said band having a smaller perimeter than said flange and being adapted to seat on said bag, a second member having a sealing surface encompassed by a down turned peripheral flange, both of said surfaces and flanges being substantially complementary, means for forcing the second member toward said first member to compress the bag between the band and the respective surfaces to seal the bag closed, said forcing means comprising studs mounted on said leaf so as to project through the opening in said band, openings in said second member adapted to receive said studs, and fastening means on said studs.

HAROLD E. BERGMAN.